(12) United States Patent
Akishiba

(10) Patent No.: US 7,242,485 B2
(45) Date of Patent: Jul. 10, 2007

(54) DISPLACEMENT GAUGE AND DISPLACEMENT MEASURING METHOD

(75) Inventor: Yuji Akishiba, Osaka (JP)

(73) Assignee: Keyence Corporation, Osaka-shi (JP)

( * ) Notice: Subject to any disclaimer, the term of this patent is extended or adjusted under 35 U.S.C. 154(b) by 228 days.

(21) Appl. No.: 10/804,183

(22) Filed: Mar. 19, 2004

(65) Prior Publication Data
US 2005/0030553 A1 Feb. 10, 2005

(30) Foreign Application Priority Data
Mar. 20, 2003 (JP) .................. P. 2003-079122

(51) Int. Cl.
G01B 11/14 (2006.01)
(52) U.S. Cl. ..................................... 356/614
(58) Field of Classification Search ................ 356/600, 356/609, 624
See application file for complete search history.

(56) References Cited

U.S. PATENT DOCUMENTS

| | | | | |
|---|---|---|---|---|
| 3,719,421 A | * | 3/1973 | Poilleux et al. | 356/4.06 |
| 3,768,910 A | * | 10/1973 | Zanoni | 356/624 |
| 3,847,485 A | * | 11/1974 | Zanoni | 356/624 |
| 4,359,282 A | * | 11/1982 | Garrison | 356/609 |
| 4,596,444 A | * | 6/1986 | Ushida | 359/813 |
| 4,732,485 A | * | 3/1988 | Morita et al. | 356/609 |
| RE33,774 E | * | 12/1991 | Gurny | 33/503 |
| 5,448,359 A | * | 9/1995 | Schick et al. | 356/609 |
| 5,836,869 A | * | 11/1998 | Kudo et al. | 600/173 |
| 5,880,465 A | * | 3/1999 | Boettner et al. | 250/234 |
| 6,590,670 B1 | * | 7/2003 | Kato et al. | 356/609 |
| 2003/0002054 A1 | * | 1/2003 | Prinzhausen et al. | 356/609 |

FOREIGN PATENT DOCUMENTS

| | | |
|---|---|---|
| JP | 7-113617 A | 5/1995 |
| JP | 7-294213 A | 11/1995 |
| JP | 7-294250 A | 11/1995 |
| JP | 8-320208 A | 12/1996 |
| JP | 9-304403 A | 11/1997 |
| JP | 3300803 B | 4/2002 |

* cited by examiner

*Primary Examiner*—Tarifur Chowdhury
*Assistant Examiner*—Isiaka O. Akanbi
(74) *Attorney, Agent, or Firm*—Smith Patent Office

(57) ABSTRACT

A displacement gauge comprises an objective lens 15 that projects light onto a measurement subject 16, an exciting portion that vibrates the objective lens 15 at a preset amplitude along an optical axis direction of light passing through the objective lens 15, a position detector for detecting the position of the objective lens 15, an objective lens scan portion 52 for scanning the objective lens 15 along a plane orthogonal to the optical axis direction, an objective lens movement detecting portion 53 for detecting the moved position of the objective lens 15, an operation processing portion 58 for calculating a distribution of displacement amount within a measuring area, based on the positional information of the objective lens 15 within the measuring area detected by the objective lens movement detecting portion 53, and the displacement amounts measured at plural measuring points, and an output portion 66 for outputting the result of calculation by the operation processing portion 58.

7 Claims, 11 Drawing Sheets

DISPLACEMENT GAUGE AND DISPLACEMENT MEASURING METHOD

DETAILED DESCRIPTION OF THE INVENTION

1. Technical Field to Which the Invention Belongs

The present invention relates to a displacement gauge and a method for measuring a displacement on the surface of a measurement subject such as metal, resin, glass, ceramic or paper by projecting a light onto the surface of the measurement subject, as well as a thickness meter for measuring the thickness of the measurement subject based on the same measurement principle.

2. Related Art

As an instrument for measuring a displacement on the surface of a measurement subject such as metal or resin, a non-contact displacement gauge of focal point detection type is employed. The present inventors have previously developed a displacement gauge as described in patent document 1. FIG. 1 shows a constitution example of the displacement gauge in patent document 1. In this displacement gauge as shown in FIG. 1, a light emitted from a laser diode 12 driven by a laser power control portion 11 is passed through a beam splitter 13, a collimator lens 14 and an objective lens 15 in succession and projected onto a measurement subject 16. A reflected light from the measurement subject 16 is passed through the objective lens 15 and the collimator lens 14, and reflected from the beam splitter 13 to pass through a pinhole 17a in a light diaphragm portion 17 forming the pinhole 17a to be incident on a photo-diode 18. A signal photoelectrically converted in the photo-diode 18 is input into an amplifier 19, its output signal X being input into an operation portion 20.

At a top end of one side longitudinal part of a tuning fork 21 like U-character, a peripheral part of the objective lens 15 is attached. The objective lens 15 is vibrated at a predetermined amplitude in an optical axis direction of light emitted from the laser diode 12 owing to oscillation of the tuning fork 21. A tuning fork amplitude detecting portion 22 that is a position detector composed of a sensor using a magnetic, optical or electrostatic capacity, for example, is disposed sideways at the top end of one side longitudinal part of the tuning fork 21, whereby the amplitude of the tuning fork 21, or the position of the objective lens 15 is detected. A detection amplitude signal detected by the tuning fork amplitude detecting portion 22 is input into an amplifier 23, its output signal Y being input into the amplifier 20. A solenoid 24 for oscillating the tuning fork 21 is disposed sideways at a top end of the other side longitudinal part of the tuning fork 21. The solenoid 24 is supplied with a control current from a tuning fork amplitude control portion 25, which is given an output signal of the amplifier 23 and controls the amplitude of the tuning fork 21 to be kept constant.

The operation of this displacement gauge will be described below. When a control current is supplied from the tuning fork amplitude control portion 25 to the solenoid 24, a magnetic field is generated according to the control current by the solenoid 24. Owing to this generated magnetic field, the tuning fork 21 is oscillated at a predetermined amplitude to vibrate the objective lens 15 in an optical axis direction of light passing through it. The tuning fork amplitude detecting portion 22 detects the amplitude of the tuning fork 21, or the amplitude of the objective lens 15, and outputs a sinusoidal signal that is the amplitude of the objective lens 15. This sinusoidal signal is amplified by the amplifier 23, an output signal Y from the amplifier 23 being input into the operation portion 20.

On the other hand, when a drive current is supplied from the laser power control portion 11 to the laser diode 12, the laser diode 12 emits a laser beam. The outgoing beam is passed through the beam splitter 13, the collimator lens 14 and the objective lens 15 and projected onto the measurement subject 16. A reflected light from the measurement subject 16 is passed through the objective lens 15 and the collimator lens 14, reflected from the beam splitter 13, and projected onto the light diaphragm portion 17, in which the light passing through the pinhole 17a is only incident upon the photo-diode 18. Therefore, the photo-diode 18 is shielded by the pinhole 17a so that reflected light caused by a latent light produced on the measurement subject 16 and a stray light from the laser diode 12 may not pass through the pinhole 17a, and the light at the focal point on the measurement subject 16 may be only permitted to be incident on the photo-diode 18.

In this case, since the objective lens 15 is vibrated, the distance between the objective lens 15 and the measurement substrate 16 is varied. If a focal point of light projected onto the measurement subject 16 occurs on the measurement subject 16 at a certain distance, a received light output of the photo-diode 18 is momentarily at maximum, and a signal according to this received light output is input into the amplifier 19, an output signal X from the amplifier 19 being input into the operation portion 20. The operation portion 20 samples the level of output signal Y at the time when the output signal X is at maximum, namely the amplitude of the objective lens 15, and outputs a displacement signal S. And the sampled displacement signal S is input into the distance conversion portion 50 for convert the displacement signal S to the distance according to the displacement signal S to measure the displacement on the surface of the measurement subject 16. The displacement on the surface of the measurement subject 16 is measured by grasping the position at which the received light amount is at maximum, namely, the position of the objective lens 15 at which the focal point of light projected onto the measurement subject 16 is obtained on the measurement subject 16, whereby the displacement is measured at high precision and high rate. Also, because of using the light diaphragm portion, the displacement gauge has less error in the measured value of displacement even if there is some reflected light caused by latent light produced on the measurement subject 16 and stray light.

[Patent Document 1]

Patent No. 3300803

However, this displacement gauge had a problem that the spot size of light projected onto the measurement subject is so small as to make the measurement impossible depending on the surface conditions of the measurement subject. For example, when there is an area where light is not normally reflected due to presence of a concave portion or hole on the surface of the measurement subject, the light projected from the displacement gauge onto the measurement subject is incorrectly reflected, and can not be measured. Also, when there are minute irregularities in the order of spot size on the surface of the measurement subject, the measured value is greatly varied if the measurement position is changed even by a small amount, or the measurement subject is moved, resulting in another problem that the correct measurement is difficult.

SUMMARY OF THE INVENTION

This invention has been achieved to solve the above-mentioned problems, and it is an object of the invention to provide a displacement gauge and a displacement measuring method capable of measuring a displacement on the surface of a measurement subject stably, irrespective of the surface state.

In order to accomplish the above object, according to claim 1 of the invention, there is provided a displacement gauge comprising a light emitting portion for emitting light to be projected onto a measurement subject 16, an objective lens 15 for receiving light emitted from the light emitting portion and projecting light onto the measurement subject 16, an exciting portion for vibrating the objective lens 15 along a first direction at a preset amplitude, a position detector for detecting the position of the objective lens 15 that is moved in the first direction, a light diaphragm portion for passing a reflected light from the measurement subject 16, a light receiving portion for receiving light passing through the light diaphragm portion, and a displacement operation portion for acquiring a detected position from the position detector at the moment when the light received amount of light received by the light receiving portion is maximum, and calculating the displacement on the measurement subject 16 based on the detected position. This displacement gauge further comprises an objective lens scan portion 52 for moving the objective lens 15 in a second direction orthogonal to the first direction, and an operation processing portion 58 for calculating the two dimensional displacement regarding the measurement subject 16, based on the measurement result of displacement at each measuring point, by moving the objective lens 15 along the second direction by the objective lens scan portion 52 to move a measuring point on the measurement subject 16 in a predetermined amount of movement and measuring the displacement at plural measuring points.

With this constitution, the objective lens is moved along the second direction orthogonal to the first direction, and the displacement amount at plural positions are measured consecutively while changing the measuring point. Hence, even if the displacement is unmeasurable at any one point, the displacement amount or its approximate value is obtained from the measurement results at its neighboring points.

Also, according to claim 2 of the invention, there is provided a displacement gauge comprising a light emitting portion for emitting light to be projected onto a measurement subject 16, an objective lens 15 for receiving light emitted from the light emitting portion and projecting light onto the measurement subject 16, an exciting portion for vibrating the objective lens 15 at a preset amplitude along an optical axis direction of light passing through said objective lens 15, a position detector for detecting the position of the objective lens 15 that is moved in the optical axis direction, a light diaphragm portion for passing a reflected light from the measurement subject 16, a light receiving portion for receiving light passing through the light diaphragm portion, and a displacement operation portion for acquiring a detected position from the position detector at the moment when the light received amount of light received by the light receiving portion is maximum, and calculating the displacement on the measurement subject 16 based on the detected position. This displacement gauge further comprises a measuring area specifying portion 51 for specifying a measuring area that is an object of measurement on the measurement subject 16, an objective lens scan portion 52 for scanning the objective lens 15 along a plane orthogonal to the optical axis direction in the measuring area specified by the measuring area specifying portion 51, an objective lens movement detecting portion 53 for detecting the position of the objective lens 15 that is scanned along the orthogonal plane by the objective lens scan portion 52, an operation processing portion 58 for calculating a distribution of displacement amount within the measuring area, based on the positional information of the objective lens 15 at plural measuring points within the measuring area, and the displacement amounts measured at the plural measuring points, and an output portion 66 for outputting the result of calculation by the operation processing portion 58.

With this constitution, the objective lens 15 is moved along the second direction orthogonal to the first direction, and the displacement amount at plural positions are measured consecutively while changing the measuring point. Hence, even if the displacement is unmeasurable at any one point, the displacement amount or its approximate value is obtained from the measurement results at its neighboring points.

Moreover, the displacement gauge according to claim 3 of the invention, in addition to claim 1 or claim 2, is characterized in that the objective lens scan portion 52 scans the objective lens at a regular interval on a path or area specified on the measurement object 16, and the operation processing portion 58 performs the arithmetical operation to display a profile of the measurement subject 16 on the specified path or area by making continuous the displacement amount measured at each measuring point.

With this constitution, the displacement amount for a portion specified by the line is acquired continuously, whereby the shape or inclination of the specified portion is detected.

Moreover, the displacement gauge according to claim 4 of the invention, in addition to claim 1 or claim 2, is characterized in that the objective lens scan portion 52 scans the objective lens 15 at a regular interval on a path or area specified on the measurement object 16, and the operation processing portion 58 performs the arithmetical operation to average the displacement amount measured at each measuring point to obtain the displacement amount on the specified path or area.

With this constitution, the average value of displacement amounts in the area specified by the line is acquired, whereby the displacement gauge can measure the displacement approximately with a larger spot size of light projected onto the measurement subject 16.

Moreover, the displacement gauge according to claim 5 of the invention, in addition to any one of claims 1 to claim 4, is characterized in that the measuring area specifying portion 51 sets up at least one of a scan width that is a range of moving the objective lens 15, a scan center that is a central position of movement, a scan period for periodically moving the objective lens 15, and a scan step that is a movement amount for each scan.

With this constitution, the displacement measurement precision or measurement time may be adequately changed according to a user's desire. For example, the scan step may be smaller to enhance the displacement measurement precision. Also, the scan step may be larger, or the movement range may be smaller to shorten the measurement time.

Moreover, the displacement gauge according to claim 6 of the invention, in addition to any one of claims 1 to claim 5, is characterized in that the displacement gauge further comprises a collimator lens 14 for converting light emitted from the light emitting portion into parallel light to be incident on the objective lens 15, in which the objective lens 15 is moved in the direction perpendicular to the optical axis of parallel light from the collimator lens 14 by the objective lens scan portion 52.

Moreover, the displacement gauge according to claim 7 of the invention, in addition to any one of claims 1 to claim 6, is characterized in that the objective lens scan portion 52 moves the objective lens 15 to be vibrated at a preset amplitude around a predetermined position.

Moreover, the displacement gauge according to claim 8 of the invention, in addition to any one of claims 1 to claim 7, is characterized in that the objective lens scan portion 52 moves the objective lens 15 in a circular arc.

Moreover, the displacement gauge according to claim 9 of the invention, in addition to claim 8, is characterized in that the objective lens scan portion 52 includes a servo motor 52A for moving the objective lens 15 in a circular arc around a predetermined rotation axis, and the objective lens movement detecting portion 53 includes a rotational angle sensor 53A for detecting the rotational angle of the servo motor 52A.

Moreover, the displacement gauge according to claim 10 of the invention, in addition to claim 8, is characterized in that the objective lens scan portion 52 includes a voice coil 52B for rotating the objective lens 15 around a predetermined rotation axis, and the objective lens movement detecting portion 53 includes a Hall element 53B for detecting the movement of the voice coil 52B.

Moreover, the displacement gauge according to claim 11 of the invention, in addition to claim 8, is characterized in that the objective lens scan portion 52 has a cantilever connected to the objective lens 15.

Moreover, the displacement gauge according to claim 12 of the invention, in addition to any one of claims 1 to claim 7, is characterized in that the objective lens scan portion 52 moves the objective lens 15 linearly.

Moreover, the displacement gauge according to claim 13 of the invention, in addition to any one of claims 1 to claim 12, is characterized by comprising an image pickup light receiving portion 65 disposed on an optical path of reflected light from the measurement subject 16, and an image pickup monitor 63 for forming an image of the measurement subject 16, based on a light reception signal detected by the image pickup light receiving portion 65, and displaying the image, in which the timing of picking up the image displayed on the image pickup monitor 63 takes places at the moment when the light received amount of the light receiving portion is maximum by exciting the objective lens 15 at a predetermined measuring point by the exciting portion.

With this constitution, the image focused on the measurement subject 16 is displayed.

Also, according to claim 14 of the invention, there is provided a method for measuring a displacement on the surface of a measurement subject 16 by receiving a reflected light of light projected onto the measurement subject 16. This method includes a step of vibrating an objective lens 15, through which the light projected onto the measurement subject 16 is passed, in an optical axis direction of light, a step of detecting a position of the objective lens that is vibrated, the position being detected at the moment when the light amount of reflected light from the measurement subject 16 is maximum, and a step of calculating a displacement on the surface of the measurement subject 16 based on the detected position. The method is characterized by further including a step of moving the objective lens in the direction orthogonal to the optical axis direction to move the measuring point on the measurement subject 16 for which the displacement is calculated, a step of measuring the displacement amount at the moved measuring point, and measuring the displacement amounts at plural measuring points, and a step of calculating the two dimensional displacement regarding the measurement subject 16 based on the displacement amount measured at each measuring point.

PREFERRED EMBODIMENTS OF THE INVENTION

The preferred embodiments of the present invention will be described below with reference to the accompanying drawings. The following embodiments simply exemplify a displacement gauge and a displacement measuring method for embodying the technical concepts of the invention, but the invention is not limited to the described embodiments of the displacement gauge and the displacement measuring method.

Also, the members as defined in the claims of the invention are not limited to those of the embodiments. In the figures, the members may be illustrated in exaggeration in respect of the size and positional relation to clarify the explanation. In the following explanation, the same or like parts are designated by the same numerals or signs, and duplicate explanation is not given. Moreover, a plurality of elements constituting the invention may be embodied by the same one member. Conversely, the function of one member may be allotted among a plurality of elements.

The displacement gauge as used in this invention means the displacement gauge for measuring the displacement on the surface of the measurement subject, including an instrument for measuring the height, depth, thickness, height difference, step difference, inclination and angle of the measurement subject, and an instrument for measuring the surface contour based on the measurement results of height and inclination. Similarly, the displacement measuring method may include the method for measuring the height, depth, thickness, height difference, step difference, inclination and angle, and the method for measuring the surface contour based on the measurement results.

Embodiment 1

Figure 1:
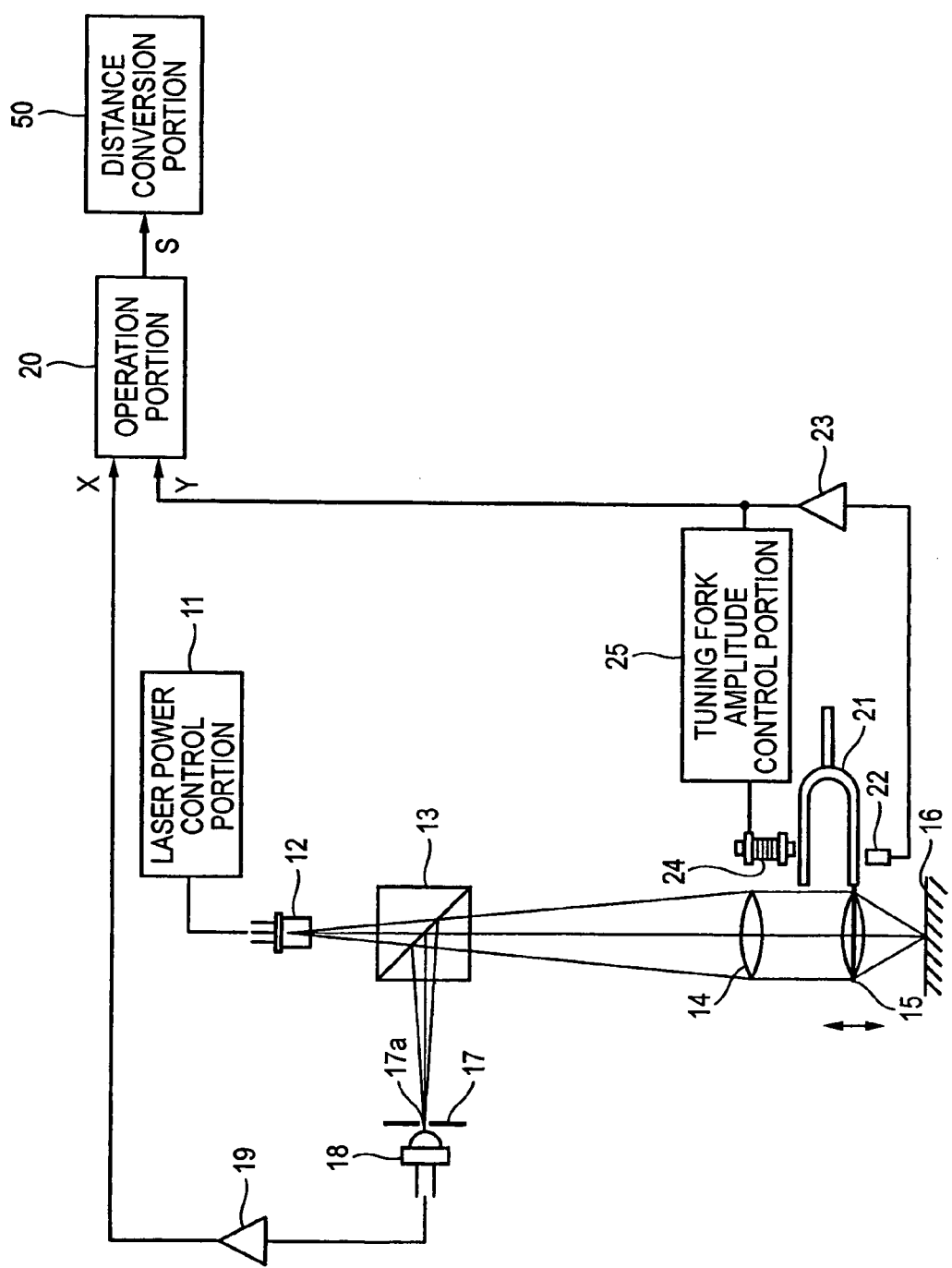
FIG. 1 is a schematic block diagram showing one example of a displacement gauge in the related art.
Figure 2:
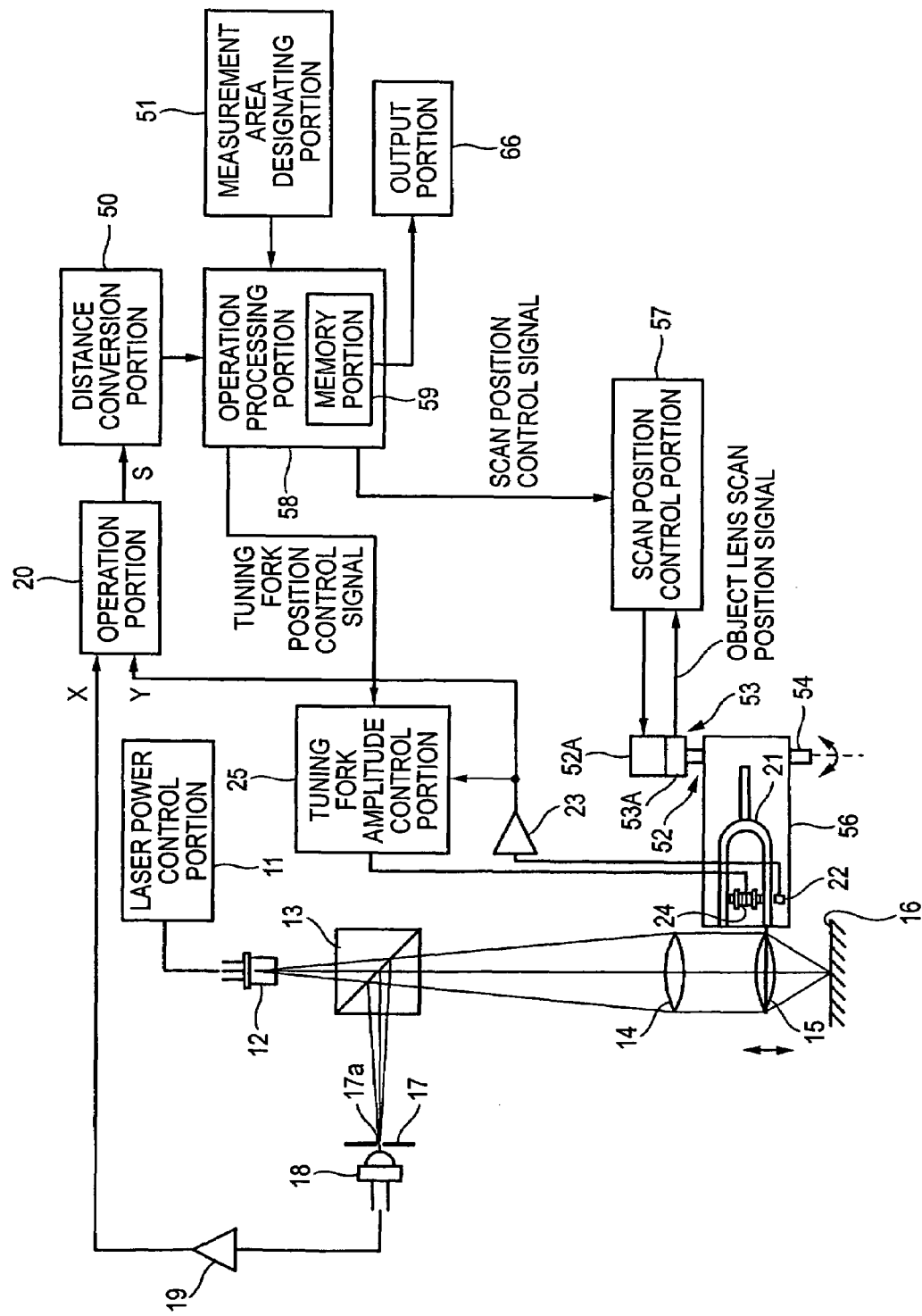
FIG. 2 is a schematic block diagram showing a displacement gauge according to an embodiment 1 of the invention.

FIG. 2 is a block diagram of a displacement gauge according to an embodiment 1 of the invention. The displacement gauge as shown in FIG. 2 comprises a laser diode 12 as a light emitting portion, a collimator lens 14 for converting light emitted from the laser diode 12 into parallel light, an objective lens 15, a tuning fork 21 holding the objective lens 15, a solenoid 24 that is an exciting portion for oscillating the tuning fork 21 in the optical axis direction, and a tuning fork amplitude detecting portion 22 that is a position detector for detecting the position of the tuning fork 21 oscillated by the solenoid 24. Also, this displacement gauge has a pinhole 17a in a light diaphragm portion 17, through which the reflected light from the measurement subject 16 passes. Moreover, a photo-diode 18 is provided as a light receiving portion for receiving light through the pinhole 17a in the light diaphragm portion 17.

A light emitted from the laser diode 12 driven by the laser power control portion 11 is passed through a beam splitter 13, a collimator lens 14 and an objective lens 15 in succession and projected onto the measurement subject 16. A reflected light from the measurement subject 16 is passed through the objective lens 15 and the collimator lens 14, reflected from the beam splitter 13 constituting a half mirror, and passed through the pinhole 17a in the light diaphragm portion 17 to enter the photo-diode 18.

A signal photoelectrically converted in the photo-diode 18 is input into an amplifier 19, its output signal X being input into an operation portion 20. At a top end of one side longitudinal part of the tuning fork 21 shaped like U-character, a peripheral part of the objective lens 15 is attached. The objective lens 15 is vibrated at a predetermined amplitude in the optical axis direction of emitted light of the laser diode 12 due to oscillation of the tuning fork 21. The tuning fork amplitude detecting portion 22 as position detector is disposed sideways at the top end of one side longitudinal part of the tuning fork 21. The tuning fork amplitude detecting portion 22 may be a sensor using magnetic, optical or electrostatic capacity, in which the amplitude position of the tuning fork 21 is detected to detect the position of the objective lens 15 connected to the tuning fork 21. The position detector may detect the amplitude of the tuning fork in this way, as well as the position of the objective lens connected to the tuning fork and vibrated.

A detected amplitude signal detected by the tuning fork amplitude detecting portion 22 is input into the amplifier 23, its output signal Y being input into the amplifier 20. The solenoid 24 for vibrating the tuning fork 21 is disposed sideways at the top end of the other side longitudinal part of the tuning fork 21.

The solenoid 24 is driven by a control current supplied from a tuning fork control portion 25. An output signal of the amplifier 23 is passed to the tuning fork amplitude control portion 25, which is controlled to keep the amplitude of the tuning fork 21 constant. The tuning fork 21 may be oscillated at 800 Hz and an amplitude of ±0.3 mm. A displacement signal calculated and output from the operation portion 20 is input into the distance conversion portion 50.

In this displacement gauge, the tuning fork amplitude detecting portion 22 detects the position of the objective lens 15 at the moment when the light received amount of light received by the photo-diode 18 is maximum, and the operation portion 20 as the displacement operation portion and the distance conversion portion 50 calculate a reflected point of light on the measurement subject 16, namely, displacement on the surface based on this position.

The operation of this displacement gauge will be described below. If a current is supplied from the tuning fork amplitude control portion 25 to the solenoid 24, a magnetic field is produced by the solenoid 24. Owing to this produced magnetic field, the tuning fork 21 is oscillated at a predetermined amplitude to vibrate the objective lens 15 in an optical axis direction of light passing through it. The tuning fork amplitude detecting portion 22 detects the amplitude of the tuning fork 21, or the amplitude of the objective lens 15, and outputs a sinusoidal signal that is the amplitude of the objective lens 15. This sinusoidal signal is amplified by the amplifier 23, an output signal Y from the amplifier 23 being input into the operation portion 20.

On the other hand, if a drive current is supplied from the laser power control portion 11 to the laser diode 12, the laser diode 12 emits a laser light. This emitted light is passed through the beam splitter 13, the collimator lens 14 and the objective lens 15 and projected onto the measurement subject 16. A reflected light from the measurement subject 16 is passed through the objective lens 15 and the collimator lens 14, reflected from the beam splitter 13, and projected onto the light diaphragm portion 17, only light transmitted through the pinhole 17a being incident upon the photo-diode 18. Therefore, the photo-diode 18 is shielded by the pinhole 17a so that reflected light caused by a latent light produced on the measurement subject 16 and a stray light from the laser diode 12 may not pass through the pinhole 17a, and the light at the focal point on the measurement subject 16 may be only permitted to be incident on the photo-diode 18.

By the way, since the objective lens 15 is vibrated, the distance between the objective lens 15 and the measurement substrate 16 is varied. If a focal point of light projected onto the measurement subject 16 occurs on the measurement subject 16 at a certain distance, a received light output of the photo-diode 18 is momentarily at maximum, and a signal according to this received light output is input into the amplifier 19, an output signal X from the amplifier 19 being input into the operation portion 20. The operation portion 20 detects the maximum value of the output signal X and correctly finds the point of time when the focal point of light projected onto the measurement subject 16 occurs. The operation portion 20 samples the level of output signal Y at the time when the output signal X is at maximum, namely the amplitude of the objective lens 15, and outputs a displacement signal S. And the sampled displacement signal S is input into the distance conversion portion 50 for convert the displacement signal S to the distance according to the displacement signal S to measure the displacement on the surface of the measurement subject 16.

In this example, the displacement of the objective lens 15 is directly obtained by sampling and holding the sinusoidal signal output from the tuning fork amplitude detecting portion 22. The method for acquiring the displacement of the objective lens 15 is not limited thereto. For example, a method is available for acquiring the displacement of the objective lens 15 indirectly from the phase or phase difference at the moment when the focal point of the measurement subject 16 occurs, noting that the signal output from the tuning fork amplitude detecting portion 22 is the sinusoidal signal with known amplitude and phase, as disclosed in Patent No. 3300803 of patent document 1.

Figure 3:
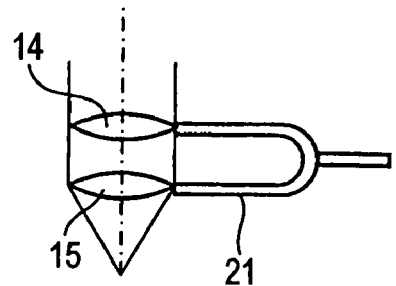
FIG. 3 is a schematic view showing another embodiment of an exciting portion.

In another embodiment of the exciting portion, not only the objective lens 15 but also the collimator lens 14 may be connected to the tuning fork 21, as shown in FIG. 3. In an example of FIG. 3, a peripheral part of the objective lens 15 is attached to the top end of one side longitudinal portion of the tuning fork 21, and a peripheral part of the collimator lens 14 disposed on the same optical axis as the objective lens 15 is attached to the top end of the other side longitudinal portion. And the objective lens 15 and the collimator lens 14 can be vibrated. In this way, the weight of one side longitudinal portion of the tuning fork 21 and the weight of the other side longitudinal portion are balanced to make the tuning fork 21 vibrate efficiently. Moreover, a piezoelectric element is fixed onto each of an outer side face of one side longitudinal portion of the tuning fork 21 and an outer side face of the other side longitudinal portion, and the tuning fork 21 is vibrated by applying a voltage to the piezoelectric element.

Such an operation method for displacement at any point on the measurement subject 16 was described in patent document 1, or another method known or developed in the future may be appropriately employed. This operation method is not described in detail here.

Measuring Area

The displacement gauge measures the displacement amount at a specified measuring point in the above way. Moreover, the displacement gauge can specify a plurality of measuring points. More specifically, a measuring area of measurement object is specified by a measuring area specifying portion 51. The measuring area is specified by a line segment such as a circular arc or straight line. As a method for specifying the measuring area by the measuring area specifying portion 51, for example, a method for specifying the start point and end point of the line segment, or a method for directly specifying an adjustable curve may be appropriately employed. Also, a scan step as an interval between measuring points may be specified in the straight line or curve in the specified measuring area. Or the user may directly specify a plurality of measuring positions as the measuring points. Or the displacement gauge may automatically set up the measuring area based on the positions specified by the user. For example, the interval between measuring points may be set to a predetermined value with reference to the specified position.

The displacement gauge measures the displacement amount at each of the measuring points within the measuring area set up in the above way. And the surface state of the measurement subject 16 is known based on the measured displacement amounts at the plural positions. For example, the profile, inclination, maximum height, minimum height, average height, height difference, and thickness for displaying the irregular shapes in the measuring area are calculated, and displayed, as needed. A display method involves displaying the profile of the measurement subject 16 as a sectional shape on the display of an output portion 66, as shown in FIGS. 6 to 10. Also, the numerical values of average height, inclination and so on may be displayed together.

With this method, since the displacement is measured at plural consecutive positions, it is possible to predict or compensate the displacement amount at any position, using the displacement amount measured at the neighboring measurable position, even when the measurement is not allowed at the position due to surface state of the measurement subject. Thereby, in employing the displacement gauge in which the spot size of light projected onto the measurement subject is small, the situation of measurement disabled is prevented.

Moreover, if the measuring area is changed from dot to linear form, the measurement is made with a spot size of light equivalently larger. For example, a predetermined line segment is specified as the measuring area, and the displacement amount is measured at each of plural measuring points within this measuring area, the average value of displacement amounts being calculated, whereby the displacement measurement is implemented equivalently with the spot size extended linearly.

In addition, since the profile within the measuring area can be measured, the height, height difference, step difference, width, and angle can be also measured in the two or three dimensional area. Particularly, the measurement results are statistically utilized by making the measurement at plural consecutive positions, whereby there is no trouble of specifying the measuring points individually, and the arithmetical operation for average, maximum value, minimum value and inclination is easily implemented, in which the environment is very easy to use.

Of course, the displacement amount at any single point may be measured by stopping an objective lens scan portion 52.

Objective Lens Scan Portion 52

Figure 4:
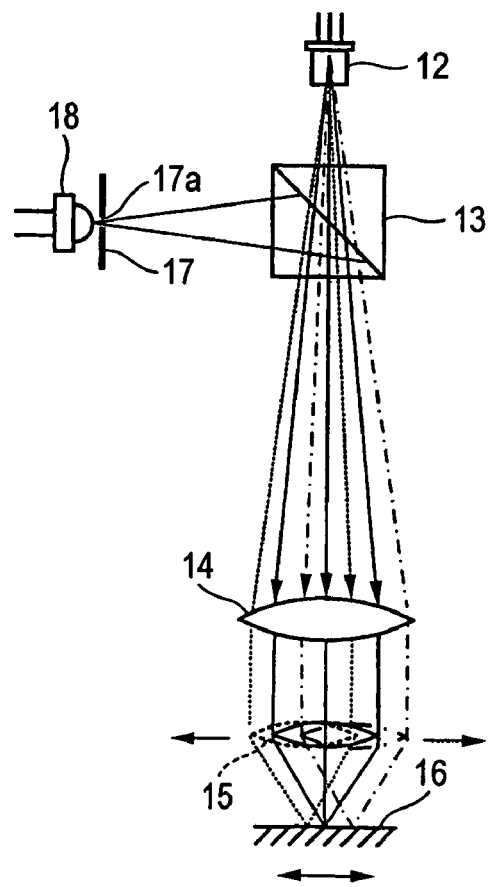
FIG. 4 is a schematic view showing a light state where light is incident on an objective lens.

The movement of measuring point is made by moving the objective lens 15. The objective lens 15 is moved in the direction orthogonal to the optical axis of light, and in the horizontal direction in FIG. 4. A light incident on the objective lens 15 from the light emitting portion is made a parallel light by the collimator lens 14 interposed. As a result, the focal distance in the optical axis direction is unchanged by moving the objective lens 15 in the direction orthogonal to the parallel light, whereby light is focused on the measurement subject 16 to allow the displacement measurement, as shown in FIG. 4. To receive the parallel light even if the objective lens 15 is moved, the objective lens 15 is preferably smaller in the diameter of lens face than the collimator lens 14, and the movable range of the objective lens 15 may be contained within the diameter of the collimator lens 14.

The objective lens 15 is moved by the objective lens scan portion 52. The displacement gauge as shown in FIG. 2 comprises a servo motor 52A as the objective lens scan portion 52, and a rotational angle sensor 53A for sensing a rotational angle of the servo motor 52A, as an objective lens movement detecting portion 53 for detecting the position to which the objective lens 15 is moved by the objective lens scan portion 52. The exciting portion is rotatably connected to the servo motor 52A via a rotational axis 54 provided on a tuning fork holder 56 holding the tuning fork 21 that constitutes the exciting portion. The rotational axis 54 is positioned so that the objective lens 15 connected to the exciting portion may be moved along a plane orthogonal to the optical axis. In FIG. 2, the rotational axis 54 is penetrated through a trailing end portion of the tuning fork holder 56, whereby the tuning fork 21 is rotated within the horizontal plane, so that the objective lens 15 may receive parallel light from the collimator lens 14 perpendicularly. The rotation of the servo motor 52A is controlled by a scan position control portion 57 connected to the servo motor 52A. The scan position control portion 57 controls the rotation of the servo motor 52A, based on a scan position control signal output from an operation processing portion 58.

Objective Lens Movement Detecting Portion 53

The rotational angle sensor 53A as the objective lens movement detecting portion is mounted to the rotational axis 54 of the servo motor 52A. The position of the objective lens 15 is detected by the rotational angle sensor 53A. The rotational angle sensor 53A sends an objective lens movement position signal to the scan position control portion 57, which controls the position of the objective lens 15 accurately based on an objective lens movement position signal and a scan position control signal. Also, the scan position control portion 57 reports the positional information of the objective lens 15 to the operation portion 20. Thereby, the displacement gauge scans while grasping the measuring position. The operation portion 50 receives the positional information of the objective lens 15, and the distance conversion portion 50 calculates the displacement amount at each measuring point and outputs the operation result to the operation processing portion 58. The operation processing portion 58 has a memory portion 59 holding the displacement amount at each measuring point. And a predetermined operation processing is performed and the results are output, as needed. For example, the operation results may be displayed on the screen, printed by the printer, stored in a storage medium, or sent out to the external equipment for other processings. For each of the processings, a display portion such as a display, a printing portion such as a printer, a medium recording portion such as a storage device, or an external apparatus such as a computer may be employed. The operation portion 50 and the operation processing portion 58 may be constituted of IC such as a system LSI, or the same circuit.

Measuring Area Specifying Portion 51

The displacement gauge as shown in FIG. 2 has the measuring area specifying portion 51 for enabling the user to specify the desired measuring area. The measuring area is specified by specifying the area to be measured with the line. For the measuring area specifying portion 51, input means such as a console, a keyboard, a mouse or a touch panel may be adequately employed. The measuring area specifying portion 51 is equipped in the displacement gauge, or may be connected as a detachable member to a main body of the displacement gauge with or without the wire. Alternatively, an input device connected to the computer, to which the displacement gauge is connected, may be employed.

Figure 5:
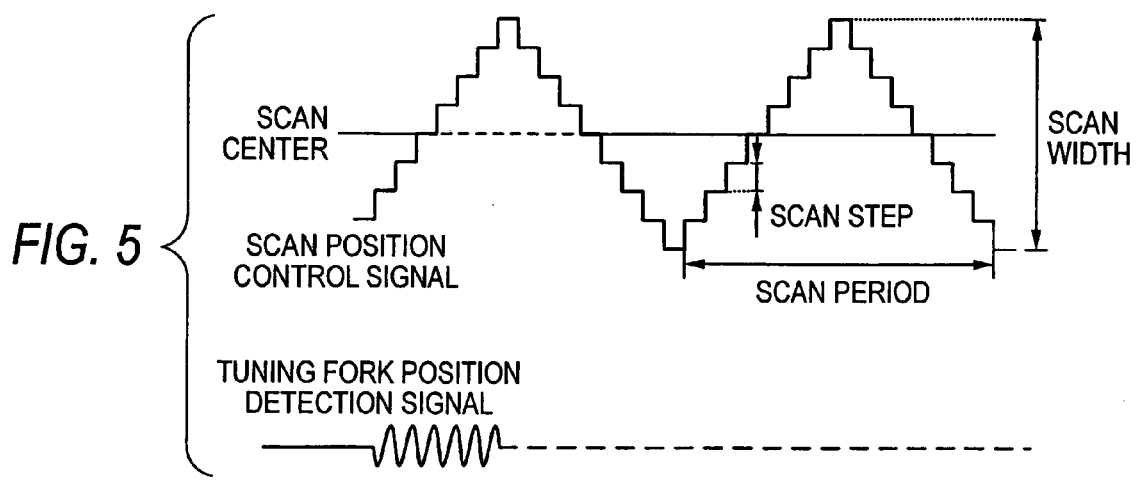
FIG. 5 is a graph showing the outline of a scan position control signal.

The measuring area specifying portion 51 is connected to the operation processing portion 58. When the user specifies the measuring area from the measuring area specifying portion 51, the operation processing portion 58 outputs a tuning fork position control signal and a scan position control signal to the tuning fork amplitude control portion 25 and the scan position control portion 57, respectively, based on the specified information to control them. FIG. 5 shows the outline of the scan position control signal. The measuring area is decided by the scan width that is a range for moving the objective lens 15, the scan center as the central position of movement, the scan period in moving the objective lens 15 periodically, and the scan step amount that is the movement amount at a time. When the user specifies the scan step and scan width, for example, the objective lens 15 is moved stepwise at the specified scan step. If the objective lens 15 is moved by the amount of scan width, it is turned back and moved in the opposite direction. The objective lens is periodically moved to scan over the surface of the measurement subject. Also, to simplify the specification, if the user specifies any one position on the measurement subject, the scan area may be automatically set up with preset scan width and scan step around the position as the scan center. The method is not limited to periodically scanning the objective lens 15, but may be implemented by specifying the path or point of measurement to move the objective lens 15 along the path specified by the user, or measure the displacement at any point.

The time or scan speed required for scanning is principally decided by the scan step and scan width. As the scan step is larger and the scan width is narrower, the scan speed is higher. On the other hand, as the scan step is smaller, the scan precision is higher, whereby the minute displacement measurement is allowed. Hence, the measurement area and its parameters are set to desired values in accordance with the balance between speed and precision.

On the other hand, in parallel to the scan position control signal, the tuning fork position signal is sent from the operation processing portion 58 to the tuning fork amplitude control portion 25, as shown in FIG. 5. Hence, the objective lens 15 is vibrated in the optical axis direction by the exciting portion, while being moved along the plane perpendicular to the optical axis, whereby the displacement is calculated by detecting the maximum value of the light receiving portion, as described above. Preferably, the objective lens 15 is vibrated in the optical axis direction over one period or more at each scan step by the exciting portion, thereby measuring the displacement at each step. To this end, the scan position control signal and the tuning fork position detecting signal are output synchronously by the operation processing portion 58.

FIGS. 6 to 10 show several examples for practically measuring the displacement on various measurement subjects 16 in the measuring area set up in the above way. These figures represent the graphs of the shape of the measurement object 16 and the surface height as the measurement result. In the figures, the measurement image is simply illustrated, but the measurement results are not necessarily consistent with the surface of the measurement subject 16.

Figure 6:
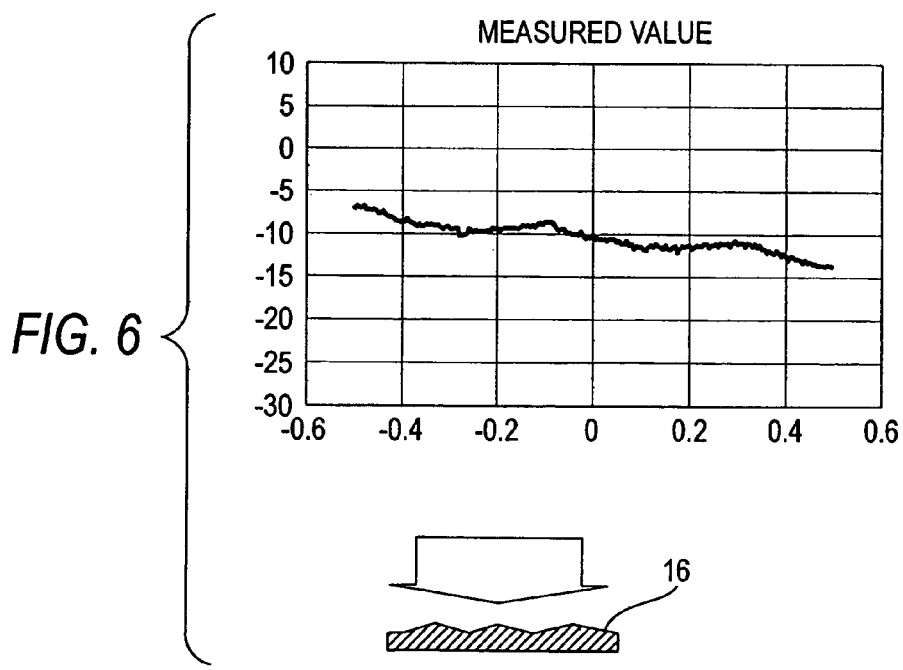
FIG. 6 is a schematic view showing one example of the measurement result of measuring the displacement on a measurement subject 16.

FIG. 6 shows the measured values of the surface profile of the metallic measurement subject 16 having a glossy face. Changes in the height within the measuring area can be displayed even with the measurement subject 16 having glossy face, as shown in FIG. 6.

Figure 7:
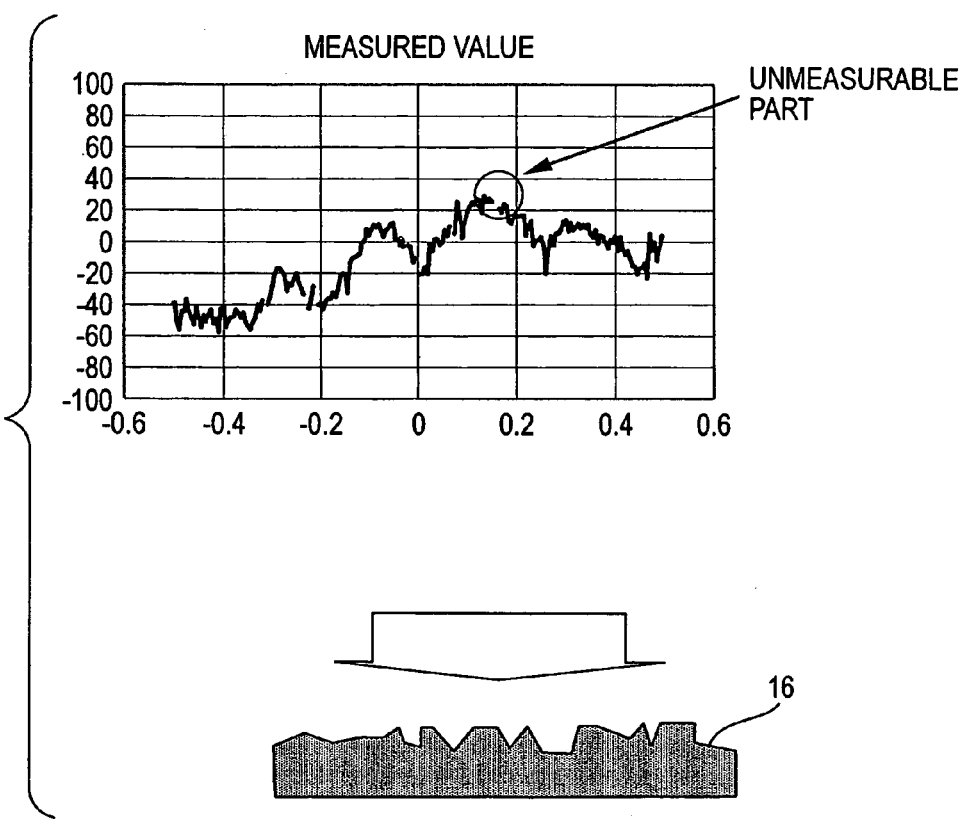
FIG. 7 is a schematic view showing one example of the measurement result of measuring the displacement on another measurement subject 16.

FIG. 7 shows one example of measuring the measurement subject 16 containing an unmeasurable point. In this example, the ceramic surface with irregularities is measured in succession. At a certain point, the measurement of displacement is not made to disable plotting of the measurement result, in which the displacement amount can be estimated from the measurement results before and after that point. Also, the displacement amount at the unmeasurable point may be calculated and compensated from the displacement amounts before and after the unmeasurable point. Or the processing for averaging all the displacement amounts, or extracting and correcting or smoothing a singular value may be added.

Figure 8:
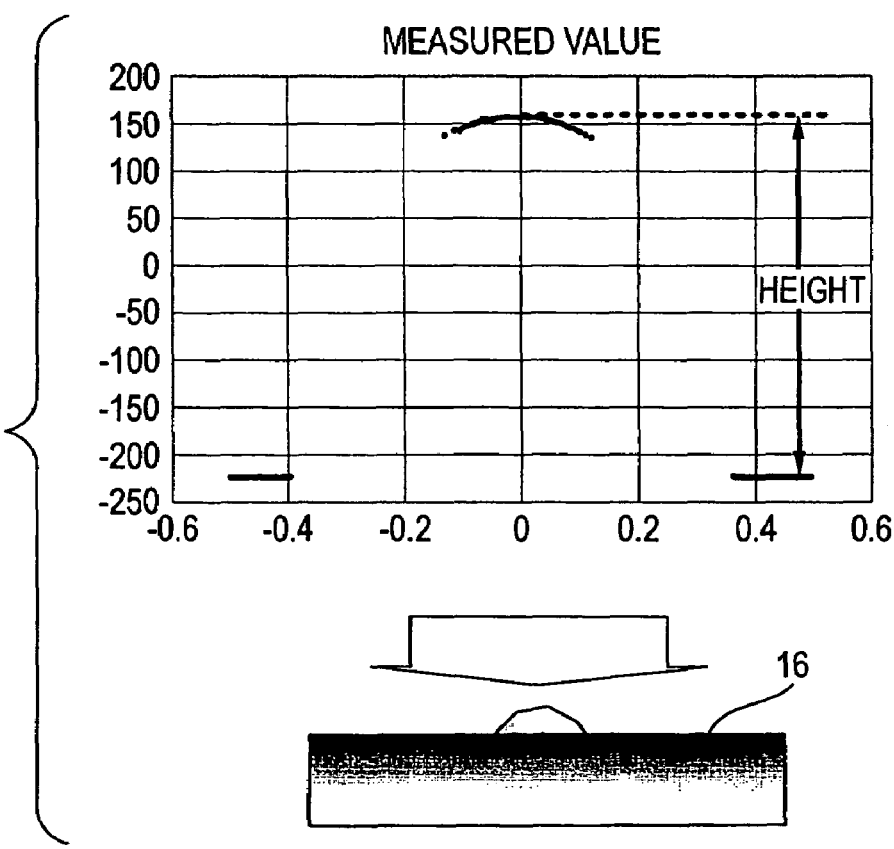
FIG. 8 is a schematic view showing one example of the measurement result of measuring the displacement on another measurement subject 16.

FIG. 8 shows one example of measuring the height of the measurement subject 16. In this example, the height difference on the surface of a transparent glass with silicone adhesive protuberant is detected. In this way, a height difference is correctly obtained by scanning over the surface of the measurement subject 16 to detect the maximum and minimum heights and calculate a difference between them.

Figure 9:
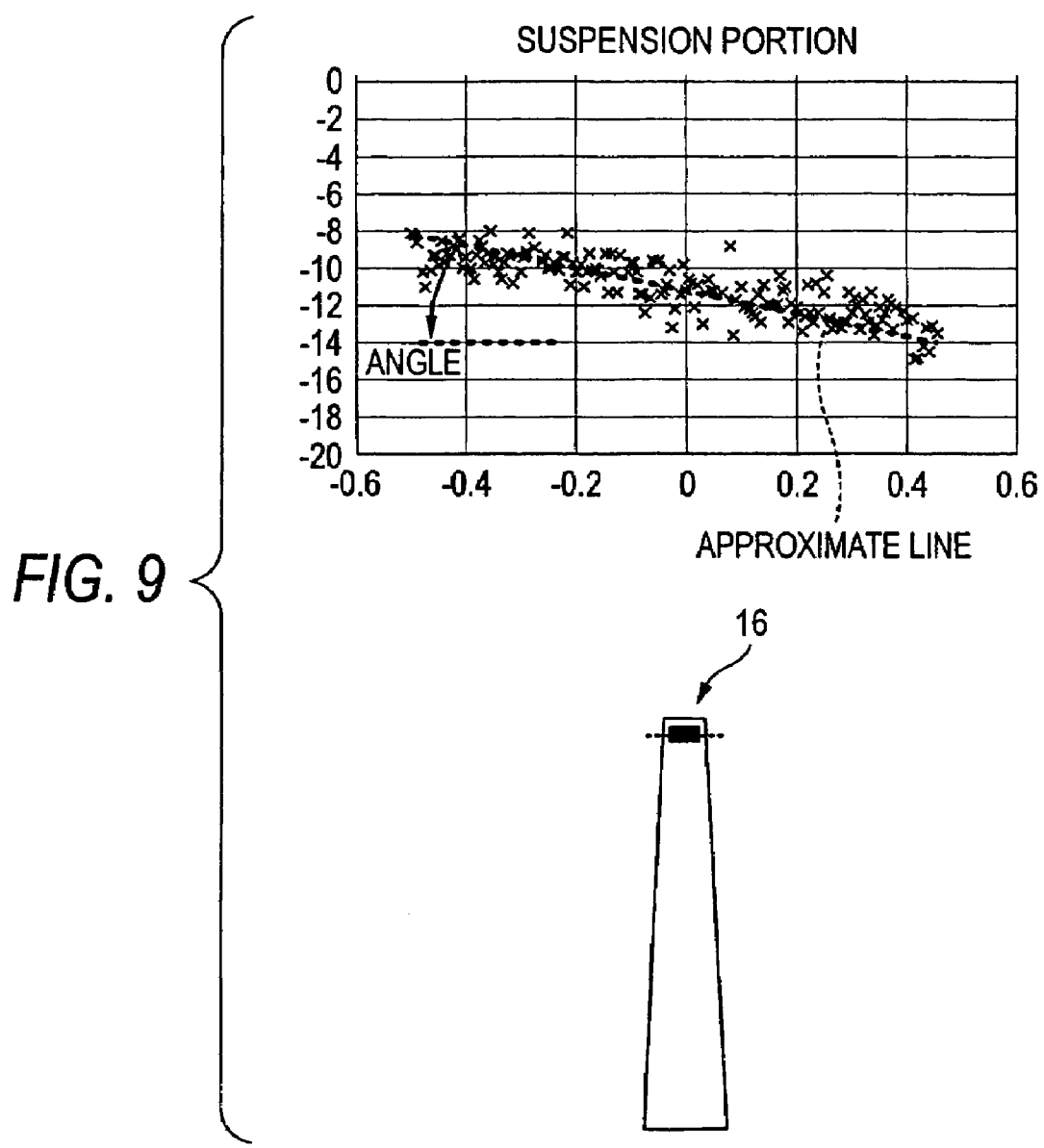
FIG. 9 is a schematic view showing one example of the measurement result of measuring the displacement on another measurement subject 16.

Also, FIG. 9 shows one example of measuring the inclination. In this example, the displacement at the top end of a head portion with ferrite and electrode is measured, and the angle of inclination is obtained from its approximate curve. In this way, even if there is dispersion in the measured values of displacement at each point, the angular characteristics are obtained from the measurement results over an entire range. Similarly, the average height over the measurement range is obtained.

Figure 10:
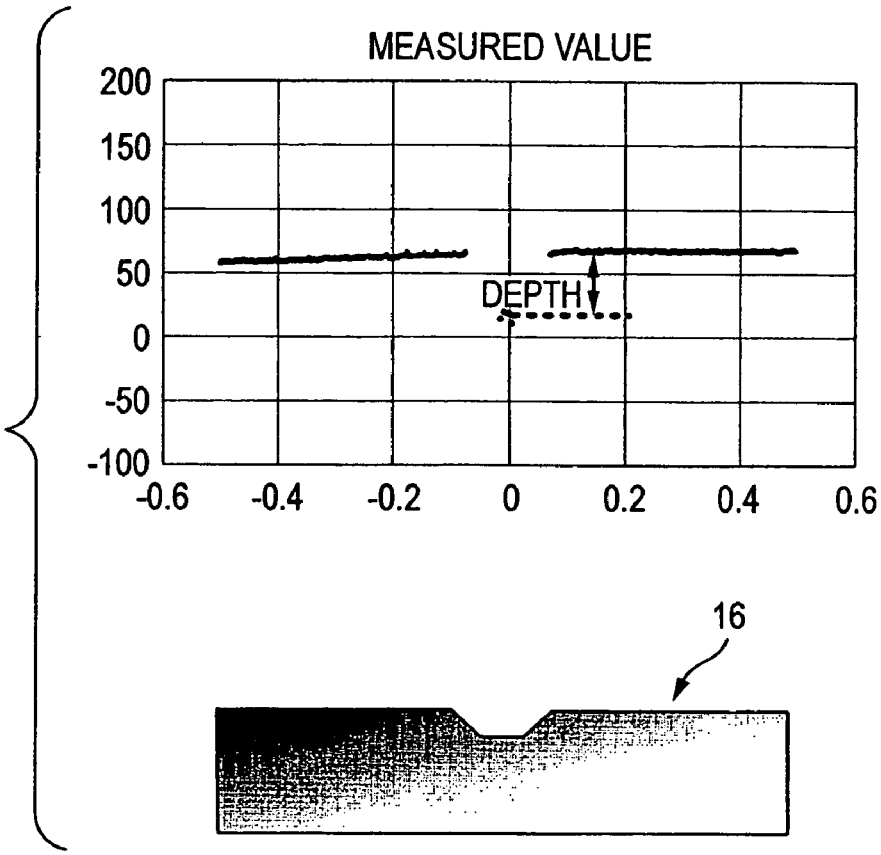
FIG. 10 is a schematic view showing one example of the measurement result of measuring the displacement on another measurement subject 16.

Further, FIG. 10 shows one example of measuring the depth. In this example, a concave portion is formed on the surface of the measurement subject 16, whereby a displacement between upper face and bottom face is measured to obtain the depth.

In this way, the displacement gauge measures the displacement amount at each of plural measuring points, and the surface condition of the measurement subject is known based on the measured displacement amounts at plural positions. Also, with the above constitution, the measuring points on the surface of the measurement subject are scanned by moving the objective lens, without moving the optical axis of light emitted from the light emitting portion. Therefore, it is unnecessary to provide a complex mechanism for scanning the optical axis of the light emitting portion, whereby an excellent feature that the scanning mechanism is constituted very cheaply is provided.

Embodiment 2

Figure 11:
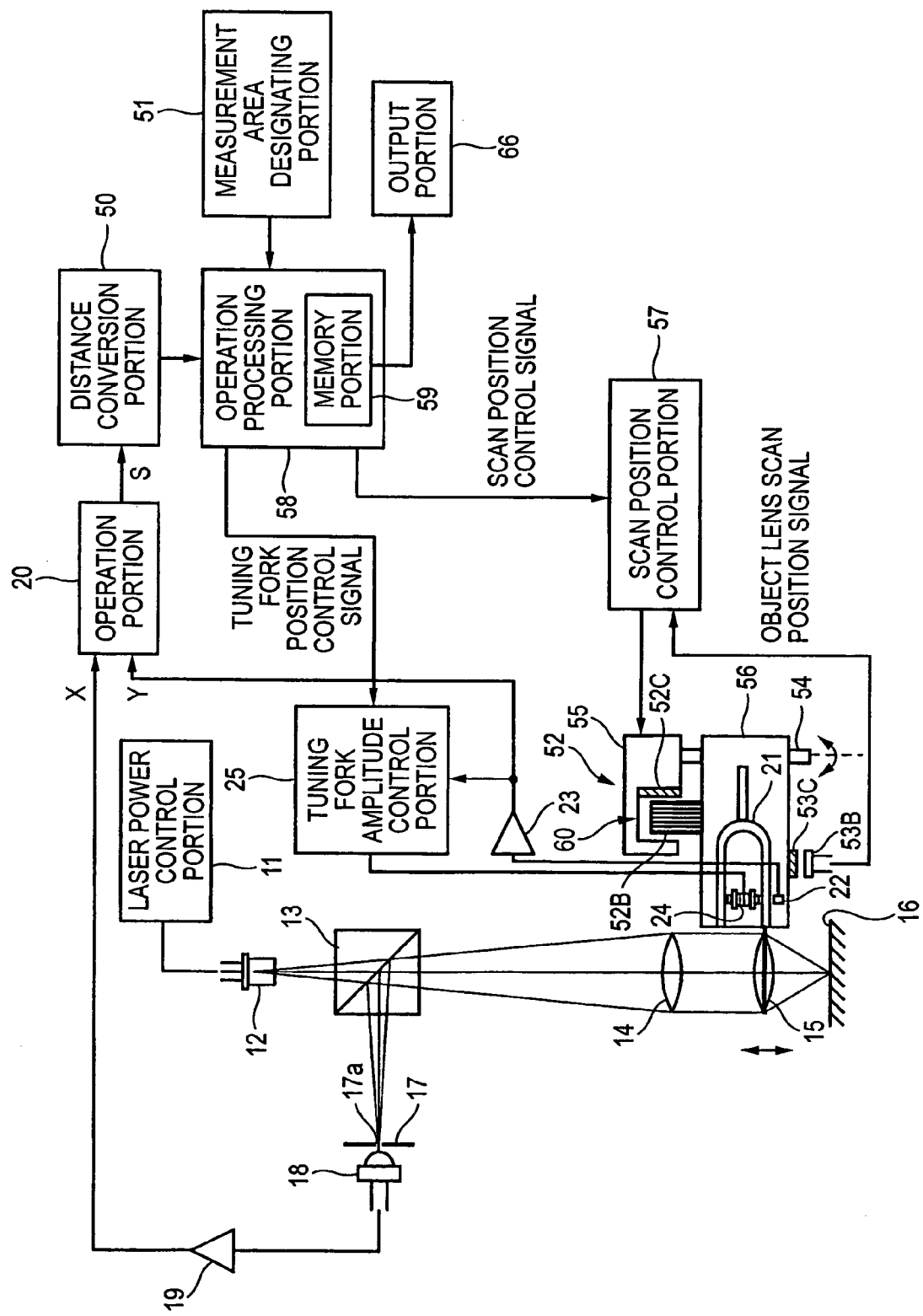
FIG. 11 is a schematic block diagram showing a displacement gauge according to an embodiment 2 of the invention.

Though the servo motor 52A is employed as the objective lens scanning portion 52 in the constitution as shown in FIG. 2, the objective lens scanning portion is not limited thereto. FIG. 11 shows the displacement gauge according to another embodiment of the invention. The displacement gauge as shown in FIG. 11 has the almost same constitution as that of FIG. 2, except that the objective lens scanning portion 52 is a rotating mechanism with a voice coil 52B and a voice coil magnet 52C, and the objective lens movement detecting portion 53 includes a Hall element 53B and a Hall element magnet 53C.

The voice coil magnet 52C is fixed in an inner face of an opening portion in a rotational axis holding portion 55 holding a rotational axis 54 and fixed in a rest state, with the opening portion 60 like U-character in cross section. On the other hand, the voice coil 52B that juts out on the upper face of the tuning fork holder 56 is inserted into the opening portion 60, and fixed to the tuning fork holder 56 to face the magnet of the voice coil 52B. This displacement gauge has the scan position control portion 57 to adjust a current flowing through the voice coil 52B, produce a drive force with the voice coil magnet 52C owing to interaction of a magnetic field crossing the current and rotate the objective lens 15 around the rotational axis 54.

Also, the movement position of the objective lens 15 is detected by the Hall element 53B and the Hall element magnet 53C. In the example of FIG. 11, the Hall element magnet 53C is fixed to the tuning fork holder 56, and the stationary Hall element 53B is provided at a position opposed to the Hall element magnet 53C. The Hall element 53B is the element for detecting magnetic field using the Hall effect with GaAs or InSb. The Hall element 53B detects the magnetic field intensity according to the distance to the Hall element magnet 53C, and outputs the rotation angle or rotation distance of the tuning fork holder 56 as an objective lens movement position signal to the scan position control portion 57.

Figure 12:
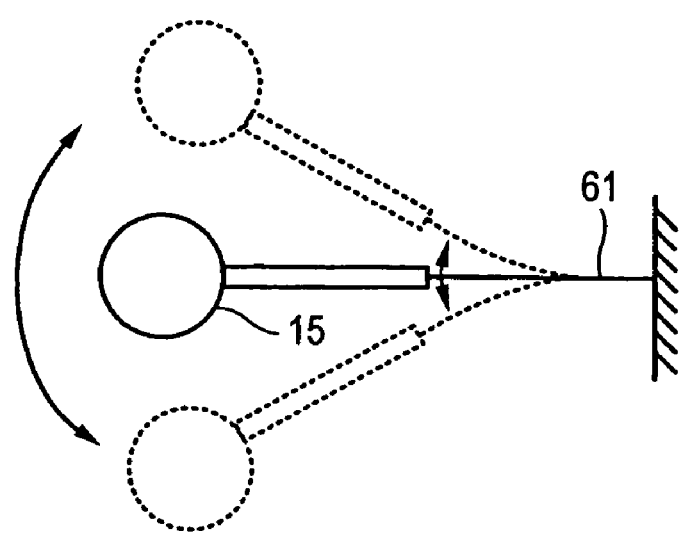
FIG. 12 is a schematic view showing another embodiment of an objective lens scanning portion.
Figure 13:
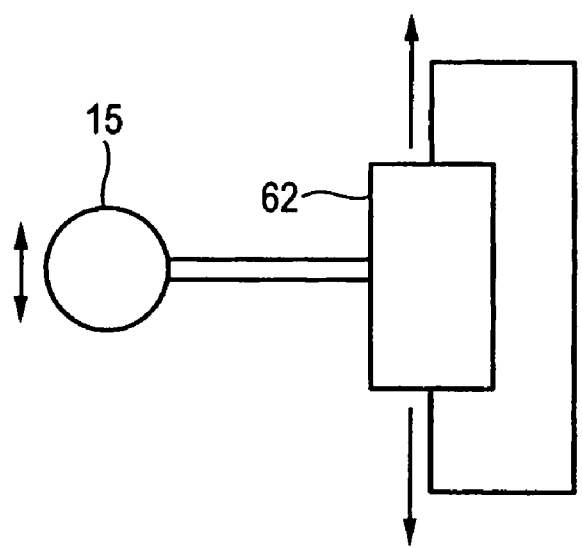
FIG. 13 is a schematic view showing a further embodiment of the objective lens scanning portion.

Moreover, the movement method of the objective lens 15 may be implemented in the manner as shown in FIGS. 12 and 13. FIGS. 12 and 13 are plan views showing a fixed state of the objective lens 15. In FIG. 12, the objective lens 15 is fixed to a leaf spring 61, and moved within the horizontal plane by vibrating the leaf spring 61. The leaf spring 61 is excited by an exciting portion, not shown. This constitution is very cheap to construct.

In the above movement method of the objective lens, its locus is like a circular arc. In this case, the locus may be linear rather than circular by increasing the radius of circular arc.

In FIG. 13, a slidable linear guide 62 is employed to move the objective lens 15 on the straight line. The linear guide 62 is slidable on the straight line along a guide rail. Hence, the objective lens 15 fixed to the linear guide 62 is securely moved linearly. In the method as shown in the figures, an objective lens movement detecting portion may be appropriately provided.

Embodiment 3

Figure 14:
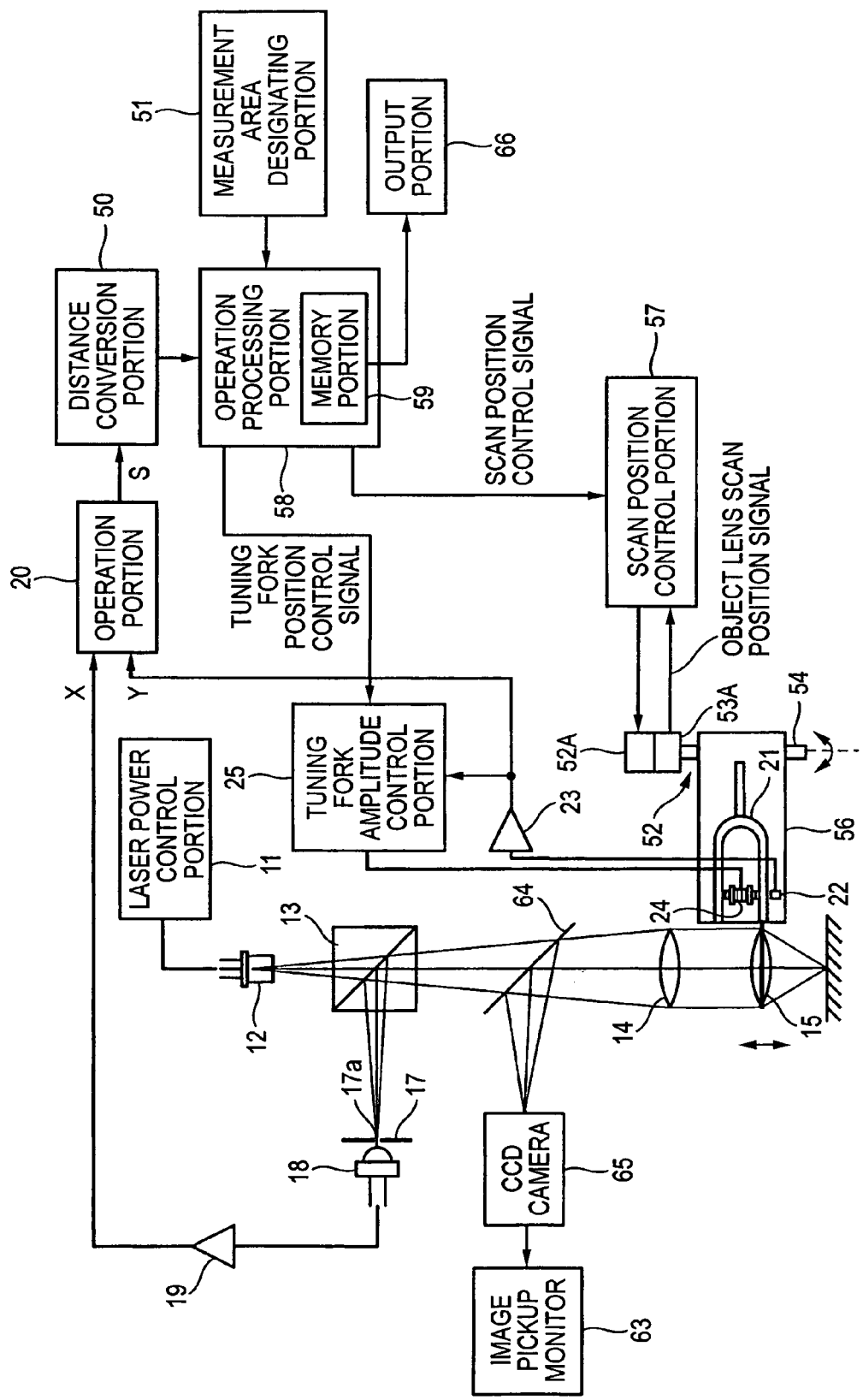
FIG. 14 is a schematic block diagram showing a displacement gauge according to an embodiment 3 of the invention.

In an embodiment 3, the displacement gauge further comprises an image pickup monitor 63 as shown in FIG. 14. The displacement gauge as shown in FIG. 14 comprises, in addition to the almost same constitution of FIG. 2, a second half mirror constituting a second beam splitter 64 provided on the optical path of the light emitting portion, an image sensor as a CCD camera as an image pickup light receiving portion 65 provided on the optical path of reflected light from the second half mirror, and an image pickup monitor 63 connected to the CCD camera. The image pickup camera 63 displays the measurement subject 16, based on a light reception signal detected by the CCD camera. The image pickup monitor 63 does not continuously display the measurement subject at any time while the objective lens 15 is moved, but picks up the image only at a specific timing to display a clear image in focus. The timing of picking up the image to be displayed on the image pickup monitor 63 takes place when the objective lens 15 is focused. The timing at which the CCD camera picks up the image to be displayed on the image pickup monitor 63 takes place at a predetermined scan position, or preferably a scan center, in the scan width of the objective lens 63 that is vibrated and moved. Thereby, even if the scan position of the objective lens 15 is changed every moment, the standstill image at predetermined scan position is displayed on the image pickup monitor 63. Also, the focusing timing takes place at the moment when the light received amount of light received by the light receiving portion is maximum in the same manner as described above. Also, an illuminating unit may be provided, as needed, and flashed in accordance with this timing. Thereby, the focusing timing is captured surely and momentarily, and an automatic focusing mechanism with very high performance is implemented without requiring any special mechanism. The image pickup monitor 63 may display only the image picked up in this way, and update the image display at the timing when the new image is picked up. Thereby, the fine image is always displayed on the image pickup monitor 63. Or when the scan speed in one period is slower than the update speed of the image pickup monitor 63 (about 60 Hz in television rate), depending on the scan width and the scan step, the image with less flicker is displayed by providing a frame memory. The frame memory stores image data of one frame or one screen. The same image data is repeatedly displayed by holding the picked up image, whereby the high quality image display is enabled to cope with the double speed display. In this example, the image pickup monitor is displayed separately from the output portion, but may be substituted for the display portion as the image pickup monitor is an example of the output portion.

As described above, in the displacement gauge and the displacement measuring method of the invention, the displacement is measured not only at one point on the measurement subject, but also within a range of linear area. Thereby, even if there is any undetectable measuring point, the point is estimated and compensated by measuring the displacement amounts around that point. Therefore, even when the fine displacement measurement of the measurement subject is made at a minute spot, the displacement gauge and the displacement measuring method are highly reliable by avoiding unmeasurable conditions. Moreover, plural measured values measured in the measuring area may be combined for processing, whereby the minute measurement is enabled by acquiring the information such as average value, height difference, inclination detection, and profile.

The invention claimed is:

1. A displacement gauge comprising:
a light emitting portion for emitting light to be projected onto a measurement subject;
an objective lens for receiving light emitted from said light emitting portion and projecting light onto said measurement subject;
an exciting portion for vibrating said objective lens along a first direction at a preset amplitude;
a position detector for detecting the position of said objective lens that is moved in said first direction;
a light diaphragm portion for passing a reflected light from said measurement subject;
a light receiving portion for receiving light passing through said light diaphragm portion;
a displacement operation portion for acquiring a detected position from said position detector at the moment when the light received amount of light received by said light receiving portion is maximum, and calculating the displacement on said measurement subject based on said detected position;
an objective lens scan portion connected to said objective lens, said objective lens scan portion has a rotational axis, said objective lens scan portion moving said objective lens in a second direction orthogonal to said first direction around the rotational axis; and
an operation processing portion for calculating the two dimensional displacement regarding said measurement subject, based on the measurement result of displacement at each measuring point, by moving said objective lens along said second direction by said objective lens scan portion to move a measuring point on said measurement subject in a predetermined amount of movement and measuring the displacement at plural measuring points.

2. The displacement gauge according to claim 1, wherein said objective lens scan portion moves said objective lens in a circular arc.

3. The displacement gauge according to claim 2, wherein said displacement gauge further comprises an objective lens movement detection portion for detecting a position of said objective lens that is moved along the second direction by said objective lens scan portion, wherein said objective lens scan portion includes a servo motor for moving said objective lens in a circular arc around the rotational axis, and said objective lens movement detecting portion includes a rotational angle sensor for detecting the rotational angle of said servo motor.

4. The displacement gauge according to claim 2, wherein said displacement gauge further comprises an objective lens movement detection portion for detecting a position of said objective lens that is moved along the second direction by said objective lens scan portion, wherein said objective lens scan portion includes a voice coil for rotating said objective lens around the rotational axis, and said objective lens movement detecting portion includes a Hall element for detecting the movement of said voice coil.

5. The displacement gauge according to claim 2, wherein said objective lens scan portion has a cantilever connected to said objective lens.

6. The displacement gauge according to claim 1, wherein said displacement gauge further comprises an image pickup light receiving portion disposed on an optical path of reflected light from said measurement subject, and an image pickup monitor for forming an image of said measurement subject, based on a light reception signal detected by said image pickup light receiving portion, and displaying said image, in which the timing of picking up the image displayed on said image pickup monitor takes places at the moment when the light received amount of said light receiving portion is maximum by exciting said objective lens at a predetermined measuring point by said exciting portion.

7. A method for measuring a displacement of the surface of a measurement subject by receiving a reflected light of light projected onto said measurement subject, the method including:
a step of vibrating an objective lens, through which said light projected onto said measurement subject is passed, in an optical axis direction of light;
a step of detecting a position of said objective lens that is vibrated, said position being detected at the moment when the light amount of reflected light from said measurement subject is maximum;
a step of calculating a displacement on the surface of said measurement subject based on the detected position;
a step of moving said objective lens by an objective lens scan portion in a direction orthogonal to the optical axis direction and around a rotational axis of the objective lens scan portion to move the measuring point on said measurement subject for which the displacement is calculated;
a step of measuring the displacement amount at said moved measuring point, and measuring the displacement amounts at plural measuring points; and
a step of calculating the two dimensional displacement regarding said measurement subject based on the displacement amount measured at each measuring point; and
a step of outputting the result of said step of calculating the two dimensional displacement by an operation processing portion.

* * * * *